United States Patent [19]
Wesley et al.

[11] Patent Number: 5,129,753
[45] Date of Patent: Jul. 14, 1992

[54] SHAPE MEMORY WIRE LATCH MECHANISM

[75] Inventors: Kerry S. Wesley, Redondo Beach; Bradley S. Cline, deceased, late of Gardena, both of Calif., by Nancy M. Cline, administratrix

[73] Assignee: TRW Inc., Redondo Beach, Calif.

[21] Appl. No.: 612,338

[22] Filed: Nov. 13, 1990

[51] Int. Cl.⁵ .............................................. B25G 3/18
[52] U.S. Cl. .................................. 403/322; 403/328; 403/404
[58] Field of Search .................... 403/404, 322, 328

[56] References Cited

U.S. PATENT DOCUMENTS

| | | | |
|---|---|---|---|
| 3,737,912 | 6/1973 | Cribb | 343/880 |
| 3,930,629 | 1/1976 | Armstrong et al. | 246/169 A |
| 4,010,455 | 3/1977 | Stange | 340/224 |
| 4,553,393 | 11/1985 | Ruoff | 60/528 |
| 4,554,905 | 11/1985 | Smyly et al. | 403/328 X |
| 4,564,775 | 1/1986 | Mazzorana | 310/62 |
| 4,586,335 | 5/1986 | Hosoda et al. | 60/528 |
| 4,665,334 | 5/1987 | Jamieson | 310/306 |
| 4,700,541 | 10/1987 | Gabriel et al. | 60/528 |
| 4,743,079 | 5/1988 | Bloch | 403/404 X |
| 4,798,051 | 1/1989 | Foote | 60/527 |
| 4,945,727 | 8/1990 | Whitehead et al. | 60/527 |

*Primary Examiner*—Andrew V. Kundrat
*Attorney, Agent, or Firm*—James M. Steinberger; Sol L. Goldstein

[57] ABSTRACT

A shape memory wire latch mechanism for releasably connecting two separable structural members. The latch mechanism utilizes the unique material properties of shape memory alloys as a means for releasing the structural members. The latch mechanism includes a pair of mating latch elements and a shape memory wire mounted on one of the latch elements. The mating latch elements attach to the two structural members and, when engaged, latch the structural members together. The shape memory wire disengages the latch elements when heated above its transition temperature, thus allowing the structural members to separate. The latch mechanism is particularly useful for securely stowing collapsible antennas and solar panels in a launch vehicle and then providing safe and reliable deployment of the antennas and solar panels once in space.

11 Claims, 3 Drawing Sheets

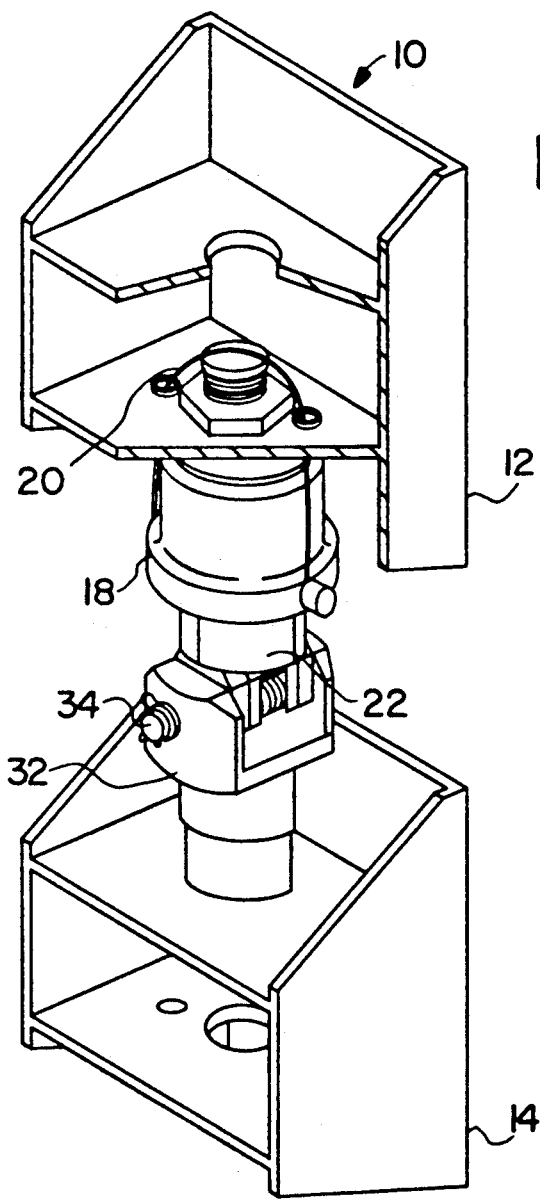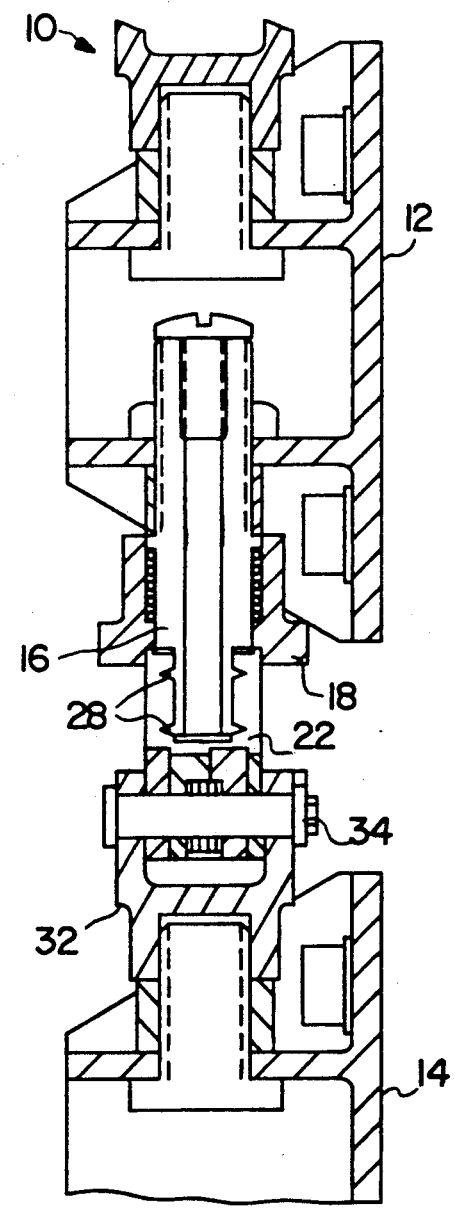
FIG. 1
FIG. 2

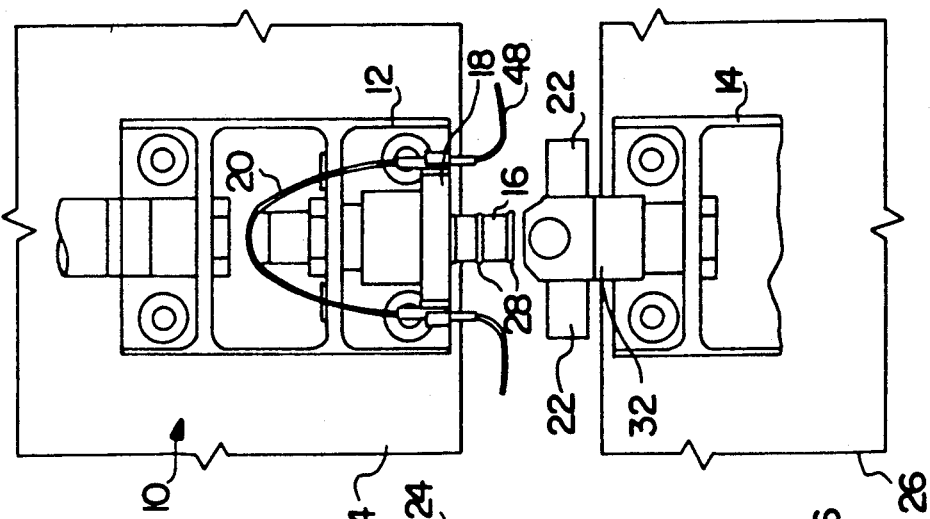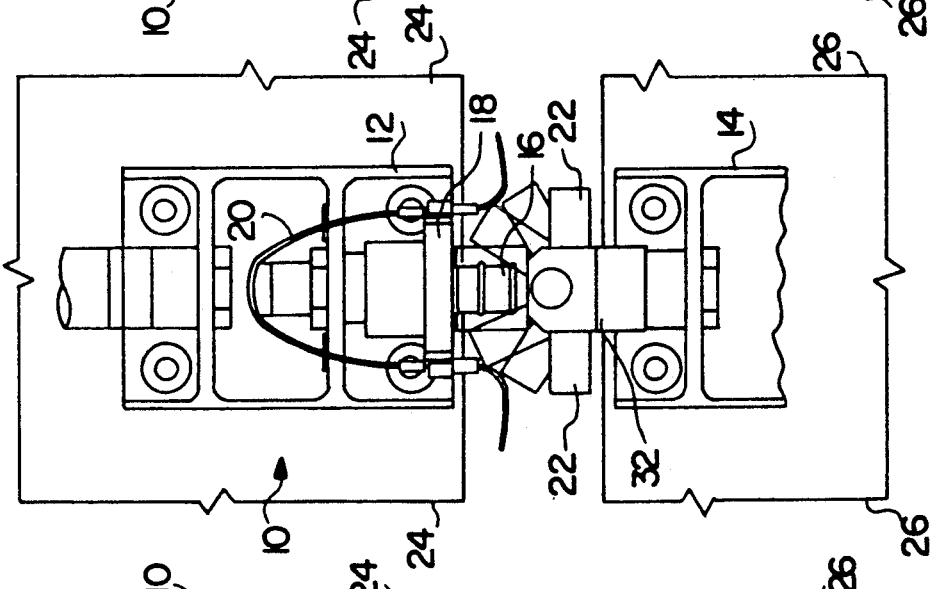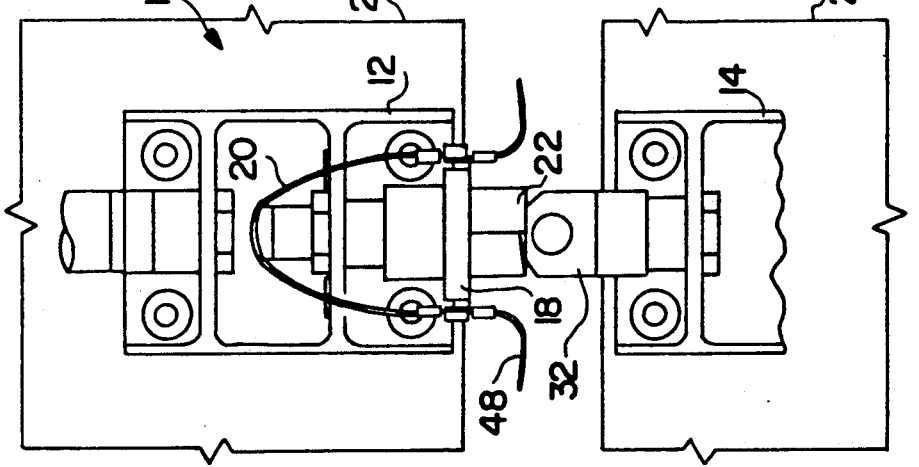

SHAPE MEMORY WIRE LATCH MECHANISM

BACKGROUND OF THE INVENTION

This invention relates generally to collapsible spacecraft structures and, more particularly, to latch mechanisms for releasably securing these structures in the collapsed configuration.

Large protruding structures on spacecraft, such as antennas and solar arrays, are typically launched in a collapsed or stowed configuration in order to fit within the launch vehicle. Once the spacecraft is in space and separated from the launch vehicle, the collapsed spacecraft structures are deployed. Pyrotechnic latch mechanisms are frequently used to secure the structural members in the stowed configuration and then ignited in space to allow the members to separate.

However, most of the large deployable structures on present spacecraft are extremely sensitive and fragile and pyrotechnic devices cause shock loads and contamination of these structures, as well as contamination of the spacecraft environment. In addition, there are safety concerns for the launch vehicle. Accordingly, there has been a need for an improved latch mechanism for releasably securing collapsible spacecraft structures. The present invention clearly fulfills this need.

SUMMARY OF THE INVENTION

The present invention resides in a shape memory wire latch mechanism for releasably connecting two separable structural members. The latch mechanism utilizes the unique material properties of shape memory alloys as a means for releasing the structural members. The latch mechanism includes a pair of mating latch elements and a shape memory wire mounted on one of the latch elements. The mating latch elements attach to the two structural members and, when engaged, latch the structural members together. The shape memory wire disengages the latch elements when heated above its transition temperature, thus allowing the structural members to separate.

The shape memory wire is preferably fabricated from one of the nickel and titanium shape memory alloys, such as Nitinol or Tinol. The shape memory effect of these alloys allows the alloy to return to a preset shape after being heated above its transition temperature. If the shape memory alloy is given this preset shape or configuration and thereafter the shape is deformed, it will retain the deformed shape until raised above its transition temperature. The shape memory alloy, when in its relatively soft and easily deformed state, is in its martensitic state. When heated above its transition temperature, the alloy is transformed into its austenitic state.

The latch mechanism of the present invention is lightweight, capable of sustaining high load conditions, and is highly reliable. The latch mechanism is particularly useful for securely stowing collapsible antennas and solar panels in a launch vehicle and then providing safe and reliable deployment of the antennas and solar panels once in space. For example, the latch mechanism allows for testing of the latch on the ground prior to launch, as opposed to pyrotechnic devices. Furthermore, the latch mechanism induces no shock loads on the structures and does not cause any contamination.

It will be appreciated from the foregoing that the present invention represents a significant advance in the field of collapsible spacecraft structures. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 1 is a perspective view of the shape memory wire latch mechanism of the present invention;

FIG. 2 is a cross-sectional view of the shape memory wire latch mechanism;

FIGS. 4a–4c are schematic illustrations showing the latching and release operation of the shape memory wire latch mechanism.

DETAILED DESCRIPTION OF THE PREFERRED EMBODIMENT

Figure 3:
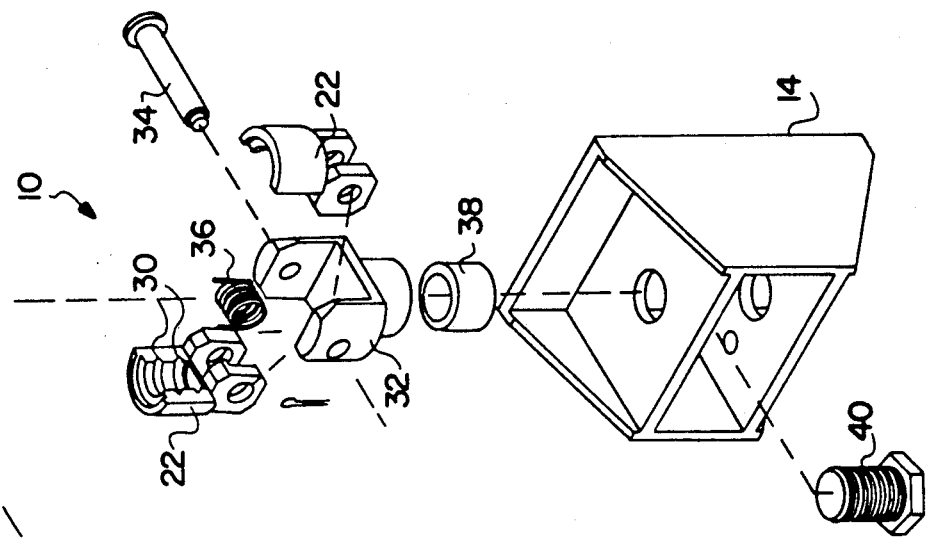
FIG. 3 is an enlarged, exploded perspective view of the shape memory wire latch mechanism.
Figure 3:
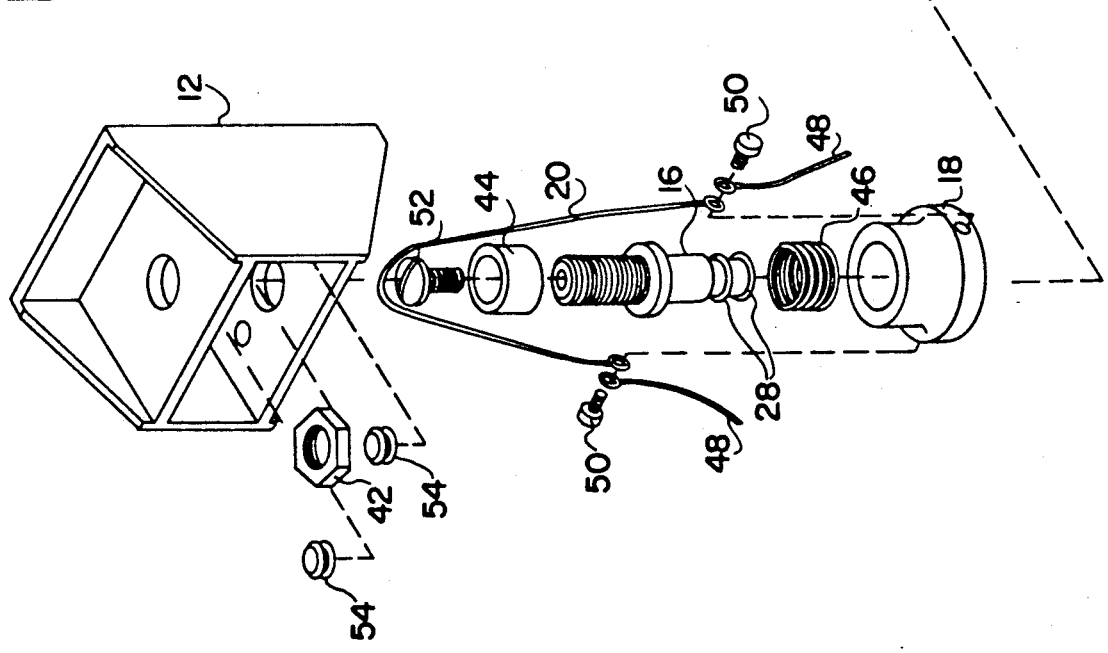

As shown in the drawings for purposes of illustration, the present invention is embodied in a shape memory wire latch mechanism for releasably connecting two separable structural members. Large protruding structures on spacecraft, such as antennas and solar arrays, are typically launched in a collapsed or stowed configuration in order to fit within the launch vehicle. Once the spacecraft is in space and separated from the launch vehicle, the collapsed spacecraft structures are deployed. Pyrotechnic latch mechanisms are frequently used to secure the structural members in the stowed configuration and then ignited in space to allow the members to separate. However, most of the large deployable structures on present spacecraft are extremely sensitive and fragile and pyrotechnic devices cause shock loads and contamination of these structures. In addition, there are safety concerns for the launch vehicle.

In accordance with the present invention, the shape memory wire latch mechanism includes a pair of mating latch elements and a shape memory wire mounted on one of the latch elements. The mating latch elements attach to the two structural members and, when engaged, latch the structural members together. The shape memory wire disengages the latching members when heated above its transition temperature, thus allowing the structural members to separate.

As shown in FIGS. 1–4, a shape memory wire latch mechanism 10 in accordance with the present invention includes first and second brackets 12, 14, a cylindrical stem 16 rigidly attached to the first bracket 12, a spring-biased retaining sleeve 18 slidably mounted on the cylindrical stem 16, a shape memory wire 20 attached to the retaining sleeve 18, and a spring-biased collet chuck 22 rotatably coupled to the second bracket 14. As shown in FIGS. 4a–4c, the brackets 12, 14 are rigidly attached to two separable structural members 24, 26 which are releasably connected by the latch mechanism 10.

FIGS. 4a–4c illustrate the operation of the latch mechanism 10, showing a latched position in FIG. 4a and a released position in FIG. 4c. As shown in FIG. 4b, the collet chuck 22 has an open and a closed position and is spring biased to the open position. The retaining sleeve 18 has a latched position, shown in FIG. 4a, and a released position, shown in FIGS. 4b–4c. The retaining sleeve 18 is spring biased to the latched position for securing the collet chuck 22 in the closed position when the collet chuck 22 and the cylindrical stem 16 are engaged, as shown in FIG. 4a.

When the shape memory wire 20 is heated above its transition temperature, as shown in FIG. 4b, the shape memory wire 20 is transformed into its austenitic state, a state in which the wire returns to its original preset shape. The preset shape in the present invention is a somewhat shorter length than when in its martensitic state. When the shape memory wire 20 returns to its preset shape, the retaining sleeve 18 is pulled from its latched position, shown in FIG. 4a, to its released position, shown in FIGS. 4b-4c. This allows the spring-biased collet chuck 22 to open to its spring-biased open position, which releases the cylindrical stem 16 and allows the two structural members 24, 26 to separate.

As shown in FIGS. 3 and 4c, one end of the cylindrical stem 16 has two annular ridges 28 about its outer circumferential surface and the collet chuck 22 has two annular grooves 30 about its inner circumferential surface. The annular grooves 30 of the collet chuck 22 engage the annular ridges 28 of the cylindrical stem 16 to carry the loads between the two structural members 24, 26.

As shown in detail in FIGS. 1-3, the collet chuck 22 is rotatably coupled to the second bracket 14 by a clevis 32 and a pin 34. The collet chuck 22 rotates about the axis of the pin 34 and is spring biased to the open position by a spring 36. The clevis 32 is rigidly attached to the second bracket 14 by a bushing 38 and a bolt 40. The cylindrical stem 16 is rigidly attached to the first bracket 12 by a nut 42 and a bushing 44. The end of the cylindrical stem 16 opposite the ridged end is threaded for receiving the nut 42. The retaining sleeve 18 is spring biased to the latched position by a spring 46.

In the preferred embodiment of the present invention, the shape memory wire 20 is heated above its transition temperature by resistive or ohmic heating. An electrical current is supplied to the memory shape wire 20 for this purpose by electrical wires 48. The shape memory wire 20 is attached at diametrically opposed positions on the retaining sleeve 18 by plastic or insulative screws 50, which electrically insulate the wire 20 from the retaining sleeve 18. The shape memory wire 20 loops over the non-ridged end of the cylindrical stem 16, which is threaded, where it is insulated from the stem 16 by a plastic or insulative screw 52. The shape memory wire 20 is insulated from the first bracket 12 by plastic or insulative bushings 54.

The shape memory wire 20 of the present invention is preferably fabricated from one of the nickel and titanium shape memory alloys, such as Nitinol or Tinol. The shape memory effect of these alloys allows the alloy to return to a preset shape after being heated above its transition temperature. If the shape memory alloy is given this preset shape or configuration and thereafter the shape is deformed, it will retain the deformed shape until raised above its transition temperature. The shape memory alloy, when in its relatively soft and easily deformed state, is in its martensitic state. When heated above its transition temperature, the alloy is transformed into its austenitic state.

The latch mechanism of the present invention is lightweight, capable of sustaining high load conditions, and is highly reliable. The latch mechanism is particularly useful for securely stowing collapsible antennas and solar panels in a launch vehicle and then providing safe and reliable deployment of the antennas and solar panels once in space. For example, the latch mechanism allows for testing of the latch on the ground prior to launch, as opposed to pyrotechnic devices. Furthermore, the latch mechanism induces no shock loads on the structures and does not cause any contamination.

From the foregoing, it will be appreciated that the present invention represents a significant advance in the field of collapsible spacecraft structures. Although a preferred embodiment of the invention has been shown and described, it will be apparent that other adaptations and modifications can be made without departing from the spirit and scope of the invention. Accordingly, the invention is not to be limited, except as by the following claims.

We claim:

1. A latch mechanism for releasably connecting two separable structural members, comprising:
   a pair of mating latch elements for attachment to the two structural members, the latch elements being engaged for connecting the two structural members and disengaged by rotative movement of one of said pair; and
   shape memory means mounted on one of the latch elements, the shape memory means disengaging the latch elements when heated above its transition temperature, thus allowing the structural members to separate.

2. The latch mechanism as disclosed in claim 1, wherein the shape memory means is heated above its transition temperature by resistive heating.

3. The latch mechanism as disclosed in claim 1, wherein the shape memory means is fabricated from a nickel and titanium alloy.

4. A latch mechanism for releasably connecting two separable structural members, comprising:
   first and second brackets for attachment to the two structural members;
   first and second mating latch elements, the first latch element being rigidly attached to the first bracket and the second latch element being rotatably coupled to the second bracket, the latch elements being engaged for connecting the two structural members; and
   shape memory means mounted on the first latch element, the shape memory means disengaging the latch elements when heated above its transit ion temperature, thus allowing the structural members to separate.

5. The latch mechanism as disclosed in claim 4, wherein the shape memory means is heated above its transition temperature by resistive heating.

6. The latch mechanism as disclosed in claim 4, wherein the shape memory means is fabricated from a nickel and titanium alloy.

7. A latch mechanism for releasably connecting two separable structural members, comprising:
   first and second brackets for rigid attachment to the two structural members;
   a cylindrical stem rigidly attached to the first bracket, one end of the stem having one or more annular ridges about its outer circumferential surface;
   a spring-biased collet chuck rotatably coupled to the second bracket, the collet chuck having an open and a closed position and being spring biased to the open position, the collet chuck having one or more annular grooves about its inner circumferential surface for mating with the annular ridges of the cylindrical stem;

a spring-biased retaining sleeve slidably mounted on the cylindrical stem, the retaining sleeve having a latched position and a released position, the sleeve being spring biased to the latched position for securing the collet chuck in the closed position when the collet chuck and the cylindrical stem are engaged; and a shape memory wire attached to the retaining sleeve for pulling the sleeve from the latched position to the released position when heated above its transition temperature, thus allowing the spring-biased collet chuck to open to the spring-biased open position, thereby releasing the cylindrical stem and allowing the two structural members to separate.

8. The latch mechanism as disclosed in claim 7, and further including a clevis and pin for rotatably coupling the collet chuck to the second bracket.

9. The latch mechanism as disclosed in claim 7, wherein the shape memory wire is looped around the non-ridged end of the cylindrical stem.

10. The latch mechanism as disclosed in claim 7, wherein the shape memory wire is heated above its transition temperature by resistive heating.

11. The latch mechanism as disclosed in claim 7, wherein the shape memory wire is fabricated from a nickel and titanium alloy.

* * * * *